W. WHITE.
CENTER BEARING.
APPLICATION FILED JULY 8, 1907.
1,095,688.
Patented May 5, 1914.
2 SHEETS—SHEET 1.
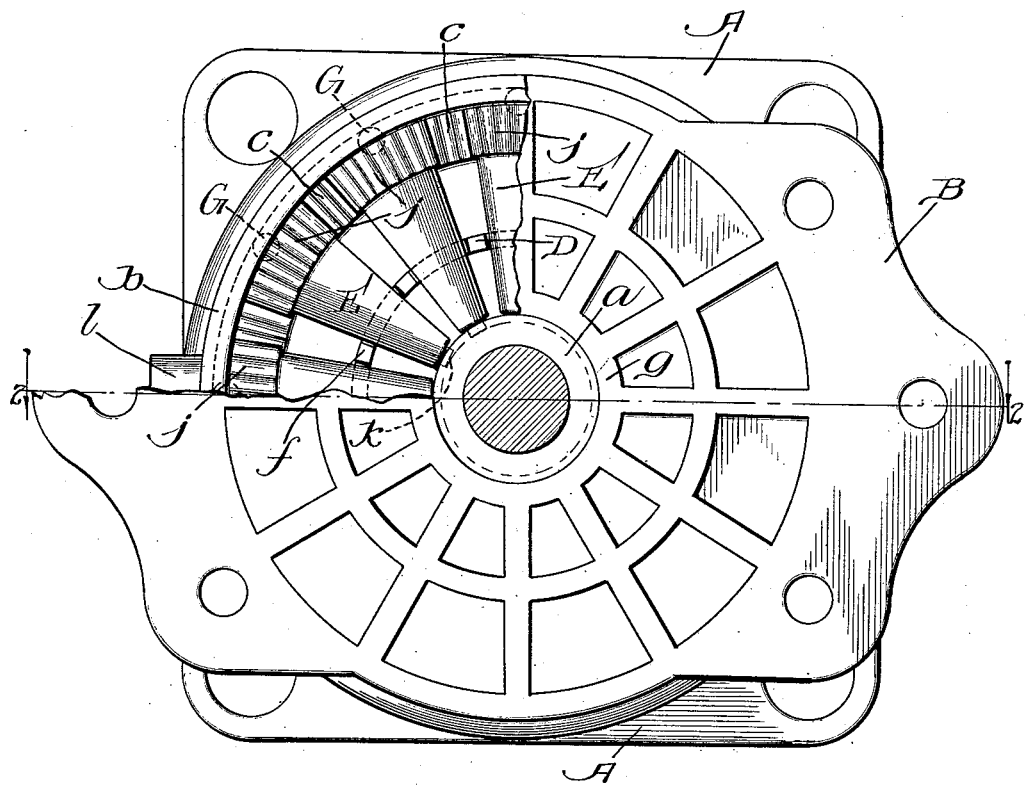
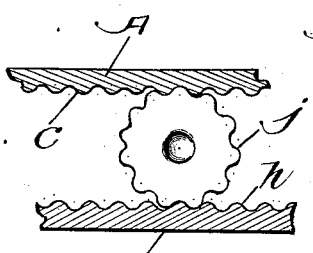

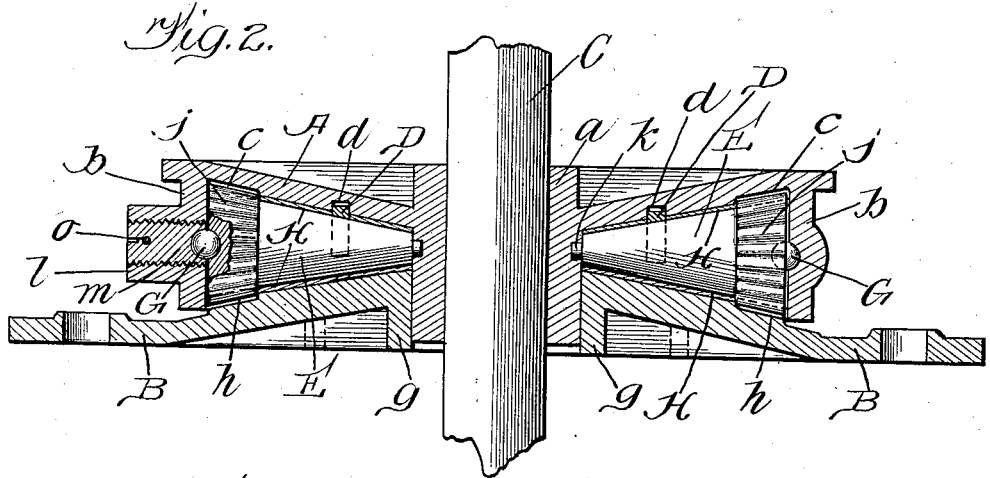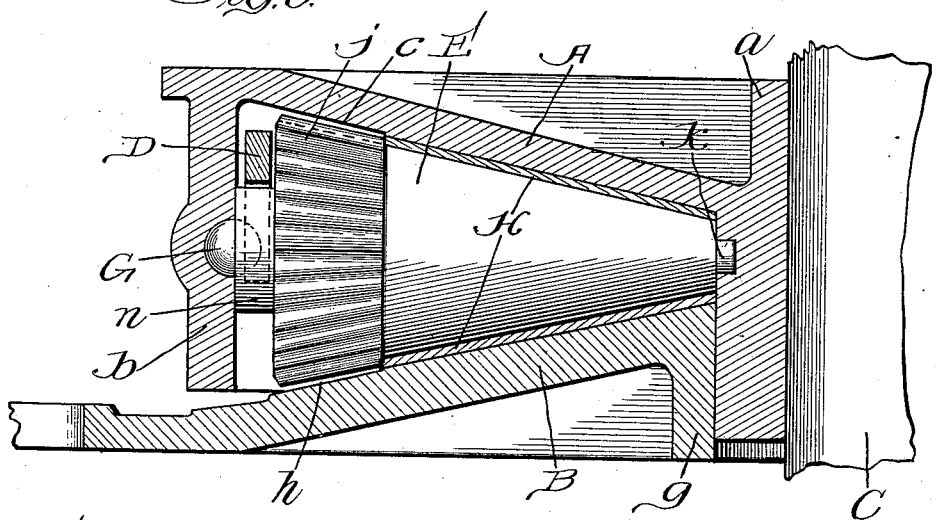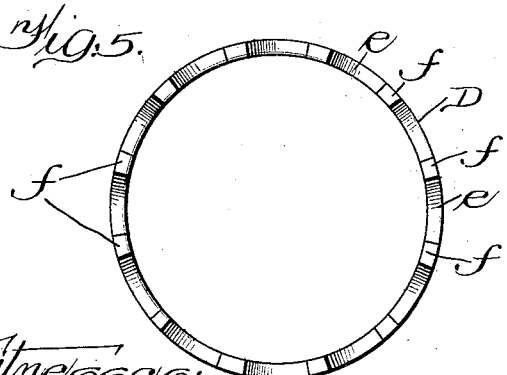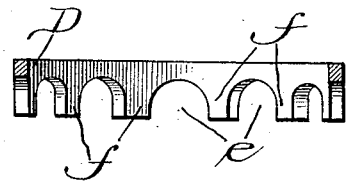

UNITED STATES PATENT OFFICE.

WILLIAM WHITE, OF RIVER FOREST, ILLINOIS.

CENTER-BEARING.

1,095,688.  Specification of Letters Patent.  Patented May 5, 1914.

Application filed July 8, 1907. Serial No. 382,576.

*To all whom it may concern:*

Be it known that I, WILLIAM WHITE, a citizen of the United States, and resident of River Forest, in the county of Cook and State of Illinois, have invented a certain new and useful Improvement in Center-Bearings, of which the following is a full, clear, and exact description, reference being had to the accompanying drawings, which form a part of my specification.

My invention relates to center-bearings for railway cars and the like, and has for its object the production of a construction which will be practically frictionless. It is of course essential in addition to being an anti-friction bearing, that the construction be such as to permit of the ready and quick assemblance of the parts.

My invention has to do more especially with anti-friction bearings employing or comprising cone-bearing rollers, wherein the cones may be given a ball-bearing thrust or contact at their outer ends. Means are also provided whereby the cones will be spaced and retained in their proper relation to each other, thus not only insuring the proper assemblage of the bearing, but also preventing any accidental displacement and consequent binding or interlocking of the bearings, as will more fully appear from the detailed description of the accompanying drawings, wherein—

Figure 1, is a plan view, with the bottom member shown on top and partly broken away, thus permitting a view of the interior of the assembled bearing in proper and operative condition. Fig. 2, is a sectional view taken on the line 2—2 of Fig. 1, with the center pin or bolt shown in full lines and broken away. Fig. 3, is a view of the base or outer end of one of the cones, showing the manner in which it is toothed, and also the cupped or rounded-out portion to receive and form a seat for a bearing-ball, with portions of the top and bottom plates shown in section, thus illustrating the manner in which the toothed cones mesh with the racks on the plates. Fig. 4, is a cross-sectional view of the annular spacing or retaining member for the cones. Fig. 5, is a bottom plan view of the same. Fig. 6, is a cross-section of one half of the bearing, illustrating a modified construction.

Like letters of reference indicate identical parts in the respective figures.

The bearing comprises the top and bottom plates or members A, and B, which are provided with the usual bolt-holes, so that they may be secured in place in the usual manner. The top member A, is preferably provided with the hub $a$, through which the pin or bolt C, passes, while its outer end is formed with the depending annular flange $b$. Extending circumferentially around the member A, and adjacent to the annular flange $b$, is a rack $c$. At a point preferably midway between the circumferential rack and the hub of the member A, the latter is provided with an annular depression $d$, to receive the upper portion of a spacing or retaining member D. This spacing or retaining member D, is more clearly shown in Figs. 4 and 5, and is preferably made of a thickness sufficient to permit it to be scalloped or have the cut-out portions or sockets $e$; thereby producing the extending parts or legs $f$, which are adapted to extend between the bearing rollers. The cut-out portions or sockets $e$, are of course made to conform with the bearing rollers, as is clearly shown in Fig. 4, thus permitting the bearings to revolve freely within the spacer D. The lower member or plate B, is provided with a central opening sufficiently large to receive the hub $a$, on the top plate or member A; and in order that the plate B, may have sufficient bearing on the hub $a$, and also on the member to which it is secured, it is provided with the downwardly projecting flange $g$. The member B, is also provided with an annular or circumferentially extending rack $h$, lying in the same vertical plane with rack $c$, on top member A. The tops of the teeth of both racks, lie flush with the balance or plain surface of the members, for the purpose hereinafter set forth. To the outside of this rack $h$, the bottom member B, is slightly depressed to receive the downwardly extending flange $b$, on the top plate or member A, as can more clearly be seen in Fig. 2, thus practically inclosing the bearings. The walls of both top and bottom members flare or diverge from their centers, as shown in Fig. 2, so as to receive the cone-rollers E, of which a suitable number are provided. These rollers E, are provided with teeth $j$, at or near the base or outer ends, adapted to mesh with the annularly extending racks $c$, and $h$, on the upper and lower members A, and B, thereby insuring a positive movement of the rollers whenever the members A, and B, are turned, thus eliminating any frictional or rubbing contact. The rollers E, are preferably provided with trunnions $k$, which take into a circumferential depression or groove in the hub $a$, of top member A, as shown in Fig. 2. The flange $b$, of member A, is grooved on its inner face, to provide a seat or race-way for the balls, G, preferably one of which is provided for each of the cones E. As these balls can only be inserted after the cones have been put in place, it is necessary to provide access to the race-way intermediate of the base of the cones and the inner surface of flange $b$. I therefore provide flange $b$, with a boss $l$, (see Fig. 2) which is tapped to receive the set-screw $m$. This set-screw is grooved on its inner end similar to the race-way on the flange $b$, so that when the set-screw $m$, is screwed into place, it will not interfere with the continuity of the raceway for the balls G.

The bearing is assembled by taking the top-member A, inverting it, and then inserting the spacing or retaining member D, in the depression or groove $d$; then the cones are inserted within the arched or cut-out portions $e$, of the member D, with the trunnions $k$ on their ends inserted within the groove extending about the hub $a$. It will be seen that member D, compels the proper placing of the cones, thus preventing their being placed irregularly and at the same time preventing their rolling out of place and into contact with each other, during the assembling of the parts. The center of each cone with its socket or dish-out portion is then successively brought opposite the hole in the boss $l$, and a steel-ball G is inserted through the opening in the boss and into the race-way formed by the dished-out portions or sockets in each of the cones and the inner surface of flange $b$. After every cone has been provided with a ball-bearing, the set-screw $m$, is screwed into place. It will be seen that the cones are now securely held in place against any displacement vertically, by the balls G, and the trunnions $k$. In order that the set-screw $m$, may not work loose in any manner, I prefer to provide the small hole $o$, through the boss $l$, and the set-screw $m$, into which may be inserted a pin, as for example a cotter-pin, thus securely holding set-screw $m$, against accidental displacement. The top member A, may now be turned over and placed on top of member B, bringing the teeth on the cones into mesh with the annular rack $h$, on the bottom member.

As before described, the rack $c$, and $h$, are merely brought up flush with the flat or plain surface of the respective members, so that the bearing strain or rubbing contact between the plates or members and the cones will not come on the teeth of the cones and the racks but on the flat surface of the plates and cones.

In order to give a greater wearing surface and thus enhance the life of the members A, and B, I prefer to place annular plates H, H, of pressed steel, intermediate of the plain surface of the cones and the members, as shown in Fig. 2. These plates can be made very thin and need merely be laid on the top and bottom members, as they will of course be held in place by the hub $a$.

In Fig. 6, I have shown a modified construction, wherein the spacing or retaining member D, is placed intermediate of the cones E, and the depending flange $b$, of top member A. In order that this may be done, the cones are cut away at the base, so as to form the trunnion $n$, which takes into the cut-out portion or socket $e$, of the member D. The trunnions $n$, are provided with the cupped or dished-out portions to form a seat for the balls G, similar to the construction previously described. In this construction, the teeth of the cones are of course farther away from the end or base, and therefore the racks on the top and bottom members must necessarily be placed slightly inward. In this construction it is not necessary to provide the top member A, with the annular groove $d$, as the retaining member D, has ample play intermediate of the trunnion $n$, and the plate A, as clearly seen in Fig. 6.

The construction described produces practically frictionless bearings and at the same time one that may be easily assembled and not permit of improper assembling. The constructions also prevent any accidental displacement of the bearings at any time.

I have described and shown my invention in connection with cone-bearings having tooth and rack connection with the top and bottom members, which is the construction preferred but it is apparent that it is equally applicable to a cone or roller bearing without the teeth and rack, as can be readily seen; I therefore do not wish to be understood as limiting myself to the exact constructions shown and described, but What I do claim as my invention and wish to secure by Letters Patent, is:—

1. A center-bearing comprising upper and lower members, one adapted to turn upon the other, one of said members provided with an annular flange about its outer edge, a plurality of conical rollers interposed between said members, the inner face of the annular flange having a groove and the adjacent faces of said rollers having sockets, balls adapted to roll in said groove and sockets, said annular flange being provided with an opening therethrough to permit of the insertion of the balls into the groove and sockets, means for closing the opening, and mechanism loosely mounted on the conical rollers whereby they are positioned and retained in their proper relation.

2. A center-bearing comprising an upper and a lower member, the upper member being provided with a hub having a circumferential groove, a depending annular flange extending about the outer edge of said upper member, a plurality of conical rollers interposed between said members, said rollers being provided with trunnions adapted to take into the circumferential groove, bearing balls intermediate of the outer ends of the conical rollers and said flange to receive the end thrusts of the rollers and lock them against vertical displacement, and means taking about said rollers whereby they are allowed to revolve but retained in proper relation to each other.

3. A center-bearing comprising an upper and a lower member, one of said members being provided with a hub having a circumferential groove, the other member taking about and having bearing on said hub, a plurality of anti-friction devices interposed between said members, wearing-plates intermediate of the anti-friction devices and the members, said members being so constructed as to substantially inclose the anti-friction devices, mechanism whereby the anti-friction devices are held against vertical displacement but permitted to revolve, and means having controlling contact with the anti-friction devices whereby the latter are positioned and retained in positive relation to each other.

4. A center-bearing comprising an upper and a lower member, one of said members being provided with a hub, the hub having a circumferential groove, an annular flange integral with one of said members and adapted to substantially inclose the space intermediate of the outer ends of said members, a plurality of conical rollers interposed between said members, said rollers being provided with trunnions at their inner ends taking into said circumferential groove, the rollers and inner face of said annular flange being provided with sockets and a groove respectively, balls adapted to roll in said sockets and groove intermediate of the end of each roller and said flange, to receive the end thrust and hold the conical bearings against vertical displacement, and a scalloped spacing-ring adapted to receive said rollers, thereby insuring their proper positions but permit of their ready revolution.

5. A center-bearing comprising an upper and a lower member, one of said members provided with a hub having a circumferential groove, an annular flange integral with one of the members and adapted to substantially inclose the space intermediate of the other ends of said rollers and the inner face ing provided with an opening there-through, a plurality of conical rollers interposed between said members and having positive relation therewith, said rollers being provided with trunnions adapted to take into the circumferential groove in the hub, the outer ends of said rollers and the inner face of the annular flange being formed to provide a race-way, balls adapted to run in said race-way and receive the end thrust of said rollers, mechanism taking into the opening in the annular flange whereby the balls are held in place and the rollers locked against vertical displacement, and a band provided with dished-out portions or sockets at predetermined intervals, said band being intermediate of one of said members and the rollers and riding freely thereon, whereby the rollers are positioned and retained in their proper relation.

6. A center-bearing comprising upper and lower members, one of said members having a hub, and an annular flange about the outer edge of said member, said flange being provided with a groove extending about its inner face, said groove having communication with the exterior of said flange, a plurality of rollers intermediate of the hub and flange, the outer ends of said rollers having sockets, while the inner ends have locking engagement with said hub against vertical movement, bearing balls adapted to take into said groove in the flange and the socket in each roller whereby the rollers are locked against vertical movement, and mechanism for closing the communication between the groove and the flange exterior, to retain the bearing balls in the groove.

7. A center-bearing comprising upper and lower members, one of said members having a hub, and an annular flange about the outer edge thereof, said flange being provided, with a groove extending about its inner face and an opening communicating with said groove, a plurality of rollers intermediate of the hub and flange, the outer ends having sockets, while the inner ends have locking engagement with said hub so as to prevent vertical movement of the rollers, bearing balls taking into said groove in the flange and the sockets in the roller-ends, to receive the end-thrust of the rollers and lock them in place against vertical movement, and means adapted to take into the opening in the flange and retain the bearing balls in place.

8. A center-bearing comprising an upper and a lower member, one of said members provided with a hub having a circumferential groove, an annular flange about the outer edge of said member, said flange being provided with a groove about its inner face having communication with the flange exterior, a plurality of rollers intermediate of the hub and flange, the inner ends of the rollers taking into the circumferential groove in the hub, while the outer ends of the rollers have sockets, bearing balls adapted to take into said groove in the flange and the sockets in the rollers whereby the latter are locked against vertical movement, and means for closing the communication of the groove in the flange with the exterior.

9. A center-bearing comprising upper and lower members, one of said members being provided with a hub having a circumferential groove, an annular flange extending about the outer edge of said member, and provided with a groove on its inner face, a plurality of rollers interposed between the members and taking into the circumferential groove, means whereby said rollers are given positive rotation upon the relative movement of the members, each of said rollers being provided with a socket in its outer end, bearing balls adapted to take into the socket in the rollers and the groove in said flange, thereby holding the inner ends of the rollers in the circumferential groove and locking them against vertical displacement.

10. A center-bearing comprising an upper and a lower member, one of said members being provided with a hub about which the other member turns, an annular flange about the outer edge of one of said members and extending toward the other member, said flange being provided with a groove on its inner face, a plurality of rollers interposed between said members, said rollers having sockets in their outer ends, means whereby a positive rotation of the rollers is caused upon the relative movement of said members, and bearing balls taking into the groove in the flange and the sockets in the rollers and holding the outer ends of the latter in place, while the inner ends of the rollers have locking engagement with the hub so as to prevent vertical movement of the rollers.

11. A center-bearing comprising upper and lower members, one of said members being provided with a hub having a circumferential groove therein, and with an annular flange at its outer edge, the inner face of which is provided with an annular groove, a plurality of rollers having trunnions taking into the circumferential groove, the outer ends of the rollers having sockets, bearing balls adapted to take into the socket of each roller and in the annular groove, whereby the inner ends of the rollers are maintained in the circumferential groove and the rollers locked in said member against vertical displacement.

12. A center-bearing comprising upper and lower members, one of which is provided with a hub about which the other member turns, a circumferential groove in said hub, an annular flange about the outer edge of said member with the hub, an annular groove on the inner face of said flange, a plurality of rollers interposed between the members and having positive engagement therewith, each of said rollers having a socket in its outer end, bearing balls adapted to take into the annular groove and the socket in each of the rollers, whereby the rollers are locked in one member against any vertical displacement, and a spacing member taking onto said rollers and maintaining their proper relation to each other.

13. A center-bearing comprising upper and lower members, one of said members having a hub about which the other member turns, and an annular flange about its outer edge with an opening there-through, both hub and flange being provided with a circumferential groove, conical rollers interposed between said members and having tooth-and-rack connection therewith, said rollers having sockets in their outer ends, while the inner ends take into said circumferential groove in the hub, bearing balls adapted to be inserted through said opening in the flange and take into the sockets of the rollers and the groove of the flange, thereby providing anti-friction bearing for the rollers and locking them in one of said members against vertical displacement, and a spacing-member taking about the rollers to maintain their proper relation to each other.

14. In a center-bearing, the combination of an upper and a lower member, one of said members having a hub about which the other turns, rollers disposed between said members and rotatably secured to one member against vertical displacement, with means intermediate of the rollers and the members whereby positive rotation of the rollers is insured upon the relative movement of the members.

WILLIAM WHITE.

Witnesses:
NORMAN A. STREET,
E. M. KLATCHER.

Copies of this patent may be obtained for five cents each, by addressing the "Commissioner of Patents, Washington, D. C."